United States Patent
Bansal et al.

(10) Patent No.: US 10,585,668 B2
(45) Date of Patent: Mar. 10, 2020

(54) PROCESSOR TESTING USING RANDOMLY GENERATED BRANCH INSTRUCTIONS

(71) Applicant: International Business Machines Corporation, Armonk, NY (US)

(72) Inventors: Abhishek Bansal, Bangalore (IN); Nitin P. Gupta, Bangalore (IN); Brad L. Herold, Austin, TX (US); Jayakumar N. Sankarannair, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 15/722,938

(22) Filed: Oct. 2, 2017

(65) Prior Publication Data
US 2018/0024833 A1  Jan. 25, 2018

Related U.S. Application Data

(63) Continuation of application No. 14/475,606, filed on Sep. 3, 2014, now Pat. No. 9,785,439, which is a
(Continued)

(51) Int. Cl.
G06F 9/30 (2018.01)
G06F 11/28 (2006.01)
(Continued)

(52) U.S. Cl.
CPC ........ *G06F 9/30058* (2013.01); *G06F 9/3804* (2013.01); *G06F 11/2236* (2013.01); *G06F 11/28* (2013.01); *G06F 9/3005* (2013.01)

(58) Field of Classification Search
CPC .... G06F 9/30058; G06F 11/28; G06F 9/3804; G06F 11/263; G06F 11/2236; G06F 9/3005
(Continued)

(56) References Cited

U.S. PATENT DOCUMENTS 5,956,478 A   9/1999 Huggins
7,130,991 B1  10/2006 Butler
(Continued)

FOREIGN PATENT DOCUMENTS

JP   2004078821   3/2004

OTHER PUBLICATIONS

Ziener, Daniel, et al.; Concepts for Autonomous Control Flow Checking for Embedded CPUs; Proceedings of the 5th International Conference on Autonomic and Trusted Computing; Oslo, Norway; 2008; pp. 234-248.

*Primary Examiner* — Aimee Li
*Assistant Examiner* — Shawn Doman
(74) *Attorney, Agent, or Firm* — James L. Baudino

(57) ABSTRACT

A process for processor testing includes generating a set of test instructions having a first portion and a second portion. A first branch instruction is randomly generated for the first portion where the first branch instruction branches to a respective instruction in a second portion by a branching location offset. A second branch instruction is randomly generated for the second portion where the second branch instruction branches to a respective instruction in the first portion by the branching location offset. If additional instructions are to be added to the set of test instructions, a value of the branching location offset is incrementing by a predetermined amount.

20 Claims, 8 Drawing Sheets

Related U.S. Application Data continuation of application No. 13/460,413, filed on Apr. 30, 2012, now Pat. No. 8,914,622, which is a continuation of application No. 12/908,370, filed on Oct. 20, 2010, now Pat. No. 8,812,826.

(51) Int. Cl.
*G06F 9/38* (2018.01)
*G06F 11/22* (2006.01)

(58) Field of Classification Search
USPC .................................................. 712/227, 234
See application file for complete search history.

(56) References Cited

U.S. PATENT DOCUMENTS

| | | |
|---|---|---|
| 8,214,819 B2 | 7/2012 | Mosberger |
| 2002/0054542 A1 | 5/2002 | Terasaka et al. |
| 2002/0054543 A1 | 5/2002 | Terasaka et al. |
| 2004/0003210 A1 | 1/2004 | Duale |
| 2009/0254782 A1 | 10/2009 | Bancel |

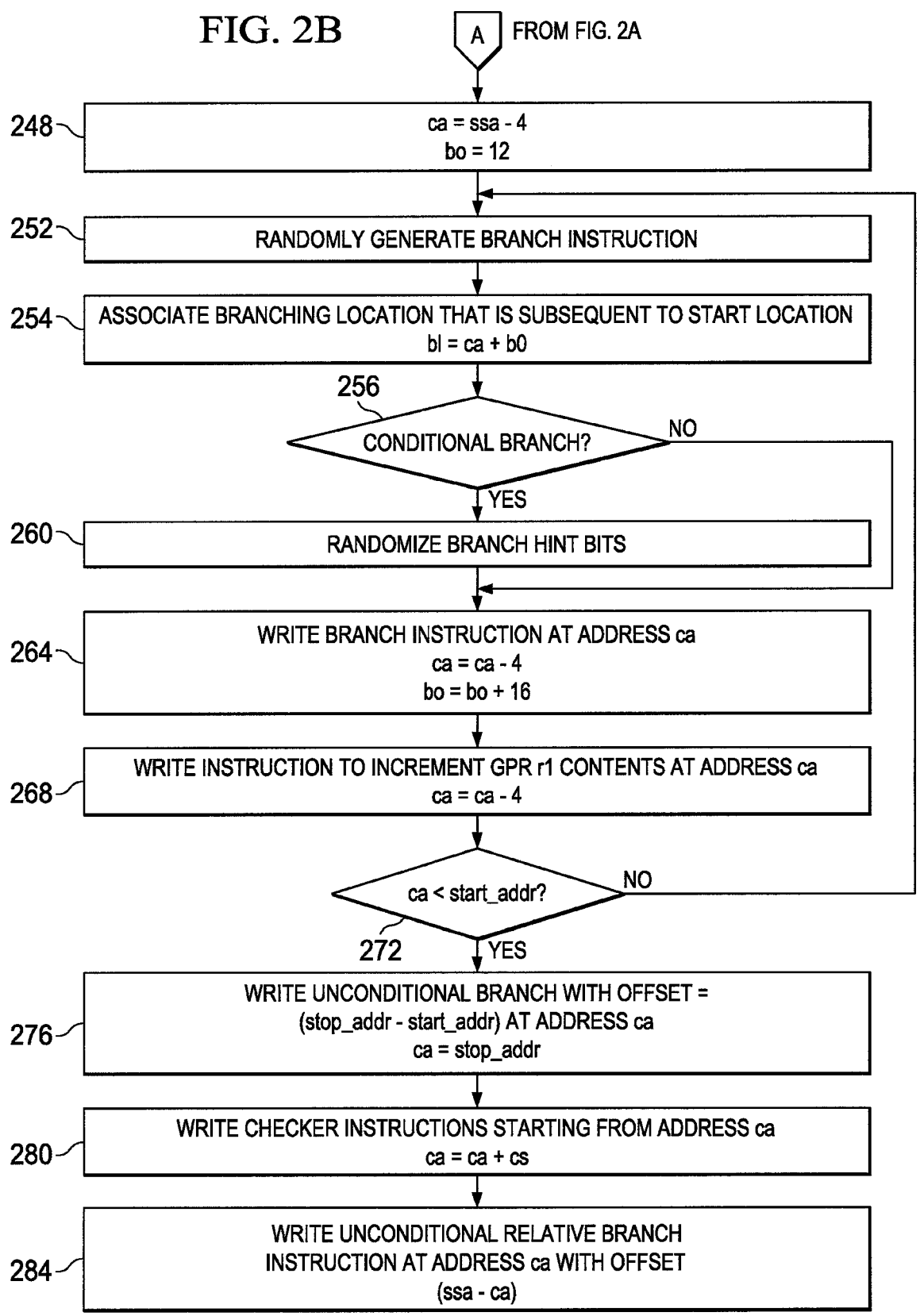

US 10,585,668 B2

PROCESSOR TESTING USING RANDOMLY GENERATED BRANCH INSTRUCTIONS

BACKGROUND

The present invention relates to processors, and more specifically to processor testing. Advanced processors typically include branch predictors that try to guess before a conditional branch is actually executed whether a condition of the conditional branch will be satisfied. The purpose of the branch predictor is to improve the flow in the instruction pipeline. That is, by guessing which way a conditional branch will be resolved, the processor can begin loading the appropriate instructions in the pipeline before executing the conditional branch. Without branch prediction, the processor would have to wait until the branch instruction was executed before fetching the next instruction for the pipeline.

When a conditional branch is initially encountered, a processor has little information on which to predict the branch target. But the branch predictor can keep a record of whether a branch is taken or not taken. Thus, when it encounters a conditional branch that has been seen before, it can base the prediction on the past history.

Branch predictors in advanced processors are complex, and so is their testing. For example, the branch predictor can have micro architectural features, like a branch history table and an effective address table, to enhance the performance of the branch instructions. Thus, run-time tests need to be performed to validate that a processor is performing properly.

BRIEF SUMMARY

In one implementation, process for processor testing includes generating a set of test instructions having a first portion and a second portion. A first branch instruction is randomly generated for the first portion where the first branch instruction branches to a respective instruction in a second portion by a branching location offset. A second branch instruction is randomly generated for the second portion where the second branch instruction branches to a respective instruction in the first portion by the branching location offset. If additional instructions are to be added to the set of test instructions, a value of the branching location offset is incrementing by a predetermined amount.

In another implementation, a process for processor testing may include generating a first instruction that increments a counter, the first counter instruction to be placed at a first location in an instruction set. The process may also include randomly generating a first branch instruction, the first branch instruction to be placed at an instruction set location subsequent the first counter instruction and branching to an instruction set location preceding the counter instruction by a predetermined amount. The process may additionally include generating a second instruction that increments the counter, the second counter instruction to be placed at the location preceding the first counter instruction. The process may further include randomly generating a second branch instruction, the second branch instruction to be placed at an instruction set location subsequent the second counter instruction and branching to an instruction set location subsequent the first branch instruction. The process may also include writing the instructions to a computer readable storage medium. In certain implementations, the process may be implemented on a computer system or by computer instructions on a computer readable medium.

BRIEF DESCRIPTION OF THE SEVERAL VIEWS OF THE DRAWINGS

FIGS. 2A and 2B depict a flowchart that illustrates another example process for generating instructions for testing a processor.

DETAILED DESCRIPTION

Figure 1:
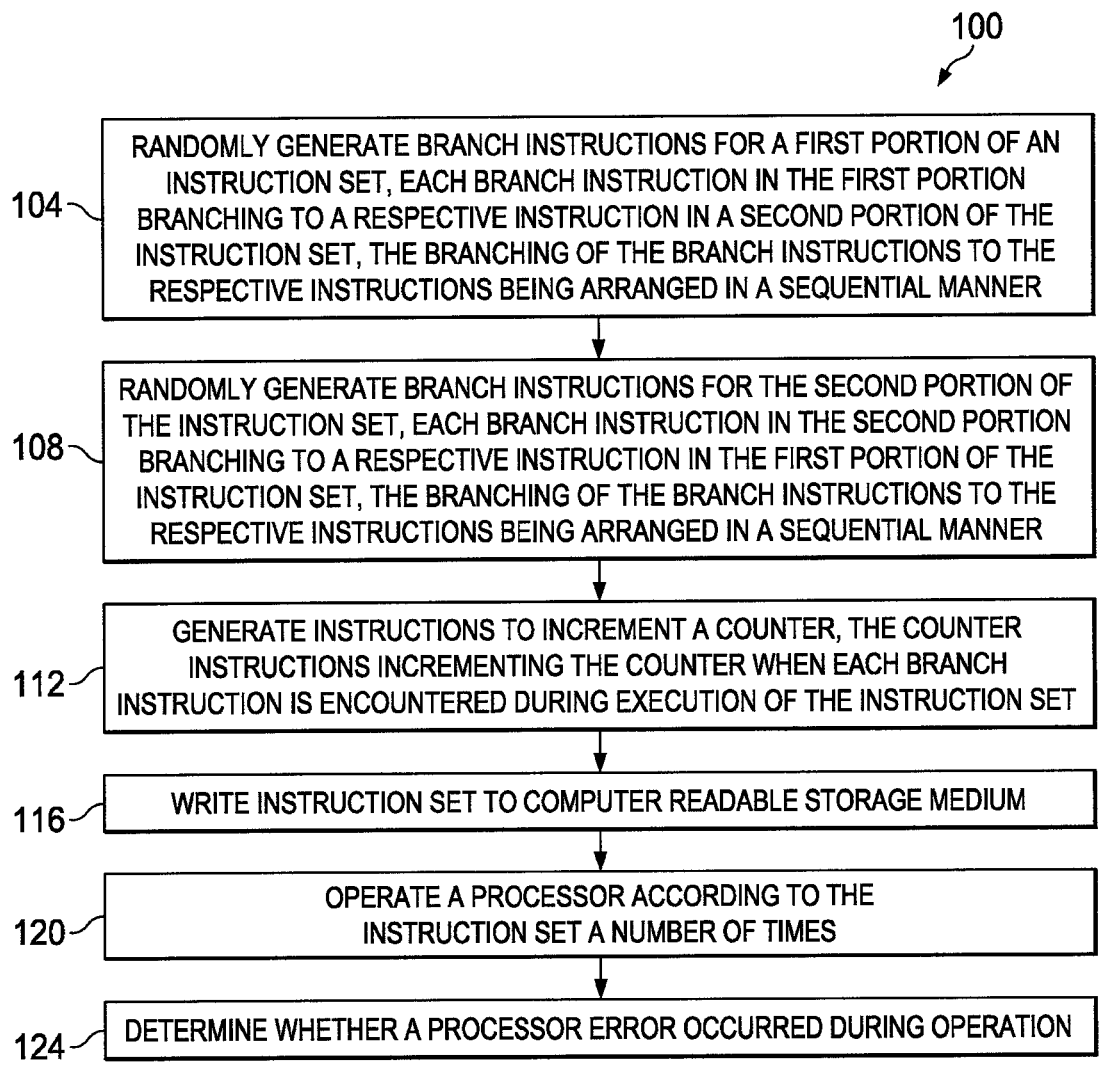
FIG. 1 is a flowchart that illustrates an example process for generating instructions for testing a processor and for testing the processor.

Instructions for testing a processor may be generated by a variety of techniques. In certain implementations, the generated processor test instructions may include pseudo-randomly generated branch instructions without infinite loops, which may allow a processor's branch prediction unit to be subjected to demanding testing. Moreover, the instructions may be used to test the processor's effective address table.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

FIG. 1 illustrates a process 100 for generating instructions for testing a processor and for testing the processor. The instructions may, for example, be generated by a first processor for testing itself of by a first processor for testing a second processor.

Process 100 calls for randomly generating branch instructions for a first portion of an instruction set, where each branch instruction in the first portion branches to a respective instruction in a second portion of the instruction set, with the branching of the branch instructions to the respective instructions being arranged in a sequential manner (operation 104). Randomly generating a branch instruction may, for example, include randomly selecting whether the branch instruction is a conditional branch. The branch instructions may, for instance, sequentially branch to successive instructions in the second portion.

Process 100 also calls for randomly generating branch instructions for the second portion of the instruction set, where each branch instruction in the second portion branches to a respective instruction in the first portion of the instruction set, with the branching of the branch instructions to the respective instructions being arranged in a sequential manner (operation 108). Randomly generating a branch instruction may, for example, include randomly generating branch hint bits, which are prediction bits typically set in instructions by a compiler, if the branch instruction is conditional. The branch instructions may, for instance, sequentially branch to successive preceding instructions in the second portion.

Process 100 additionally calls for generating instructions to increment a counter, the counter instructions incrementing the counter when each branch instruction is encountered during execution of the instruction set (operation 112). The counter may, for example, be a register counter or a variable in a computer program.

Randomly generating a first portion branch instruction and generating an associated counter instruction may, for example, include generating a first instruction that increments a counter and is associated with a first location in the instruction set and randomly generating a first branch instruction that branches to an instruction set location preceding the counter instruction by a predetermined amount and is associated with an instruction set location subsequent to the first counter instruction. The first location may, for example, be an approximate mid-point of the instruction set.

Randomly generating a second portion branch instruction and generating an associated counter instruction may, for example, include generating a second instruction that increments the counter and is associated with the instruction set location preceding the first counter instruction and randomly generating a second branch instruction that branches to an instruction set location subsequent the first branch instruction and is associated with an instruction set location subsequent the second counter instruction.

Process 100 further calls for writing the instruction set to a computer readable storage medium (operation 116). The computer readable storage medium may, for example, be random access memory (RAM) or a hard drive. The instructions may form an instruction stream for the processor to be tested.

Process 100 also calls for operating a processor according to the instruction set a number of times (operation 120). By operating the processor according to the instruction set a number of times, deviations in processor performance can be determined from run to run of the instruction set.

Process 100 additionally calls for determining whether a processor error occurred during operation according to the instruction set (operation 124). Determining whether a processor error occurred may, for example, include determining whether the number of branches encountered during each run is the same. If the number of branches encountered between two runs is different, then an error probably occurred in the processor.

Although FIG. 1 illustrates one example of a process for generating test instructions for a processor, other processes for generating test instructions may include additional, fewer, and/or a different arrangement of operations. For example, a test instruction generation process may include placing processor performance analysis instructions in the instruction set. The analysis instructions may, for example, determine whether the appropriate number of branches was encountered during execution of the instruction set. As another example, a test instruction generation process may include determining an amount of instruction set locations available for storing the branch and counter increment instructions and generating branch and counter increment instructions to at least substantially fill the locations. The amount of instruction set locations available may, for instance, be based on an amount of computer readable storage memory available. As an additional example, the generation of the first portion branch instructions, the second portion branch instructions, and the counter instructions may occur in an interleaved manner. As a further example, the instructions in the instruction set may be written to the computer readable storage as they are generated. As another example, the operation of the processor according of the instruction set may not be performed.

Figure 2A:
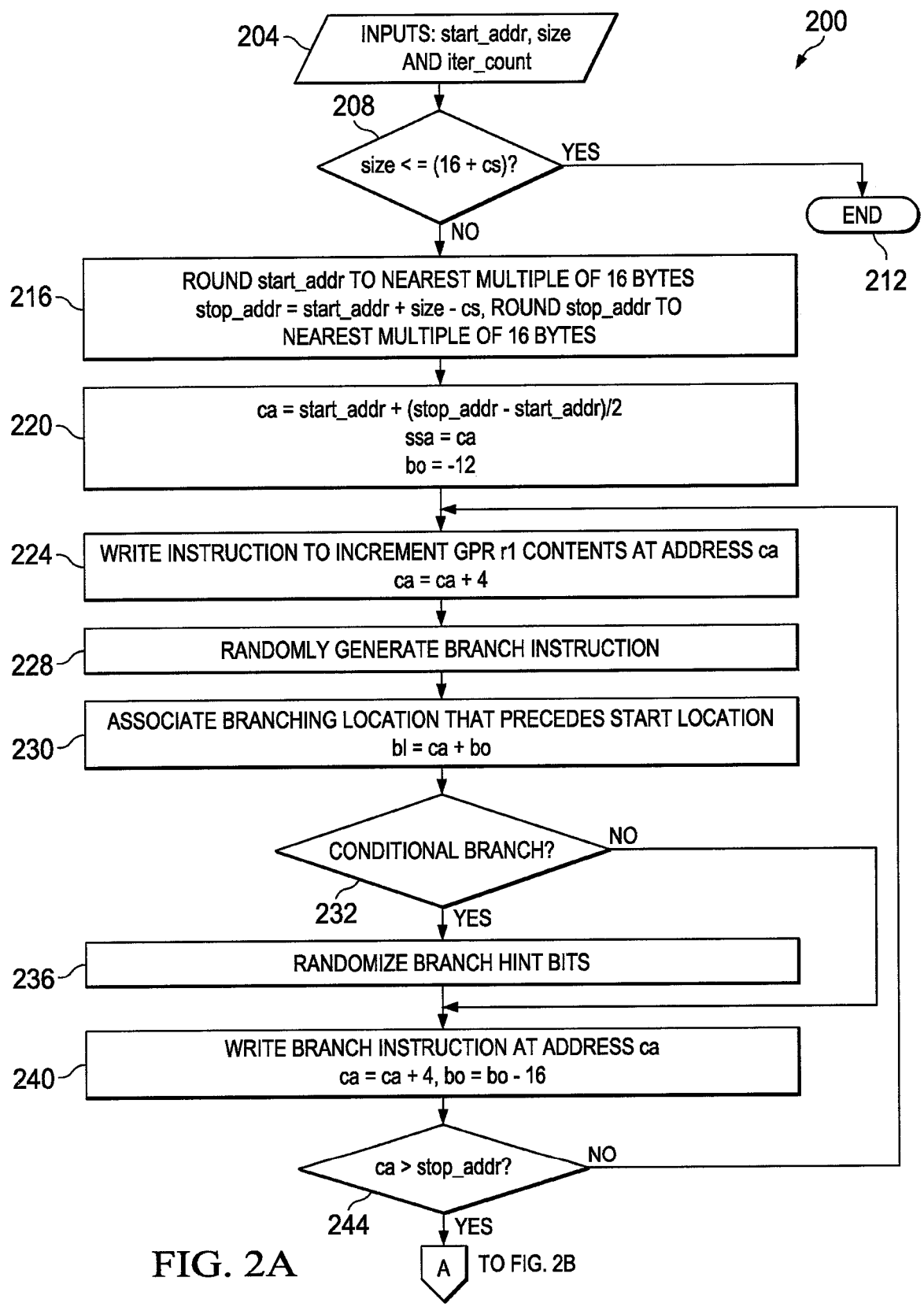

FIGS. 2A and 2B illustrate another example process 200 for generating instructions for testing a processor. In this example, each instruction is four bytes in size; however, the instructions could be other sizes in other processes for generating processor test instructions. Process 200 may, for instance, be executed on a general purpose computer system, which may or may not include the processor to be tested, and may be incorporated into other test instruction generation methods. The generated instructions may, for example, be assembly language instructions.

Process 200 calls for determining the data for calculating the locations for the test instructions (operation 204). In particular, operation 204 calls for determining the start location (start_addr) for the instruction locations and the amount of instruction locations available (size). In particular implementations, the start location could be a location in computer readable storage memory, and the amount of instruction locations available could be a memory size. Additionally, operation 204 calls for determining the number of iterations (iter_count) over which to run the test instructions for testing the processor. In particular implementations, the values for these variables may be received from an operator.

Process 200 also calls for determining whether the amount of instruction locations available is less than the amount of locations needed for test analysis instructions and a small number of test instructions (operation 208). In particular, operation 208 calls for determining whether the amount of instruction locations available (size) is less than the amount of locations required for the test analysis instructions (CS) and 16 bytes, which is an amount of spaced needed for a small number of test instructions in this implementation. If the amount of instruction locations available is not large enough for the test analysis instructions and a small number of test instructions, process 200 ends (operation 212).

If, however, the amount of instruction locations is large enough for the test analysis instructions and a small number of test instructions, process 200 calls for determining beginning and ending locations for the test instructions (operation 216). In particular, operation 216 calls for adjusting the start location (start_addr) for the test instructions (if necessary), determining a stop location for the test instructions (stop_addr) that allows room for the test analysis instructions, and adjusting the stop location so that it is congruent with a whole number of instructions (if necessary).

Process 200 also calls for determining the location in the instruction locations to start associating test instructions (operation 220). In particular, operation 220 calls for determining the mid-point of the test instruction locations, which will be the instruction set start location (SSA), establishing the current location for writing a test instruction (CA) as the instruction set start location, and establishing a branching location offset (BO). By starting to associate instructions at the mid-point of the test instruction location, the generated test instructions will first fill a portion of the test instruction locations.

Process 200 further calls for associating an instruction to increment a counter with the start location to start associating test instructions (operation 224). In particular, operation 224 calls for writing an instruction to increment a counter (R1) at the current instruction location (CA) and updating the current instruction location so that the next instruction will be written subsequent to the one just written. The counter, as will be explained in more detail below, will be useful in determining whether the processor to be tested is performing appropriately.

Additionally, process 200 calls for randomly generating a branch instruction (operation 228). Randomly generating a branch instruction may, for example, include randomly determining whether the branch instruction is conditional. Furthermore, if the branch instruction is conditional, the conditional logic of the branch structure (e.g., if x<0) may be randomly generated.

Process 200 also calls for associating a branching location that precedes the start location with the generated branch instruction (operation 230). In particular, operation 230 calls for assigning the branching location as the current instruction location (CA) adjusted by the branching location offset (BO). Thus, the branching location will be in a second portion of the test instructions, which precedes the previously written test instructions in this implementation.

Process 200 also calls for determining whether the generated branch instruction is a conditional branch (operation 232). If the generated branch instruction is conditional, process 200 calls for randomizing branch hint bits for the branch instruction (operation 236).

Process 200 calls for associating the branching instruction with an instruction location subsequent the current counter instruction (operation 240). In particular, operation 240 calls for writing the branch instruction to the current instruction location (CA), along with adjusting the current instruction location and the branching instruction offset (BO) for the next sequence of writing instructions. Thus, the branching location is predetermined in this implementation.

Process 200 additionally calls for determining whether the first portion of the instruction locations can hold any more test instructions (operation 244). In particular, operation 244 calls for determining whether the current instruction location (CA) is beyond the end location for the test instructions (stop_addr). If the first portion of the instruction locations has not been filled, process 200 calls for, among other things, associating another instruction to increment the counter with a location after the just generated branch instruction (operation 224) and randomly generating another branch instruction (operation 228) that will branch to a location previous to the first counter instruction (operation 230).

Once the first portion of the test instruction locations has been filled, process 200 continues with generating test instructions for a second portion of the test instruction locations, including branching instructions that branch to the first portion. To accomplish this, process 200 calls for adjusting the instruction association location to be in the second portion of the test instructions and the branching location to be in the first portion (operation 248). In particular, operation 248 calls for updating the current instruction location (CA) to precede the set starting location (SSA) and the branching instruction offset (BO) to be subsequent to the set starting location.

Process 200 also calls for randomly generating another branch instruction (operation 252). Randomly generating a branch instruction may, for example, include randomly determining whether the branch instruction is conditional. Additionally, if the branch instruction is conditional, the conditional logic of the branch structure (e.g., if x<0) may be randomly generated.

Process 200 additionally calls for associating a branching location that is subsequent to the start location with the branch instruction (operation 254). In particular, operation 254 calls for assigning the branching location as the current instruction location (CA) adjusted by the branching instruction offset (BO), which will cause the branching instruction to branch to a predetermined location in the first portion of the test instruction locations in this implementation.

Process 200 further calls for determining whether the generated branch instruction is a conditional branch (operation 256). If the generated branch instruction is conditional, process 200 calls for randomizing branch hint bits for the branch instruction (operation 260).

Process 200 also calls for associating the branch instruction with a test instruction location that precedes the start location (operation 264). In particular, operation 264 calls for writing the branch instruction to the current instruction location (CA), along with updating the current instruction location (CA) and the branching instruction offset (BO).

Process 200 further calls for associating an instruction to increment the counter with a location preceding the just generated branch instruction (operation 268). In particular, operation 268 calls for writing an instruction to increment the counter (R1) to the current instruction location (CA) and updating the current instruction location (CA).

Process 200 additionally calls for determining whether the second portion of the instruction locations can contain more test instructions (operation 272). In particular, operation 272 calls for determining whether the location for the next test instruction is beyond the beginning location for the test instructions (i.e., if CA is <start_addr). If the second portion can hold more test instructions, process 200 calls for, among other things, randomly generating another branch instruction (operation 252) that will branch to a location lower in the first portion (operation 264) and assigning another increment instruction for the counter (operation 268), which will be associated with an instruction location preceding the just generated branch instruction.

Once the second portion of the test instruction locations has been filled, process 200 calls for associating an unconditional branch instruction that branches to the test analysis instructions at the first location for the test instructions (operation 276). In particular, process 200 calls for writing an unconditional branch instruction at the current instruction location (CA) that branches to a location at the end of the test instructions (stop_addr-start_addr), along with updating the current instruction location to the last test instruction location (stop_addr).

Process 200 also calls for associating the test analysis instructions with the instruction locations (operation 280). In particular, operation 280 calls for writing the test analysis instructions beginning with the current instruction location (CA). The test analysis instructions, which will be discussed in more detail below, may, for example, determine whether the appropriate number of branches was encountered by a process while executing the test instructions. Additionally, operation 280 calls for updating the current instruction location (CA) to the end of the test analysis instructions.

Process 200 also calls for generating an unconditional branch instruction to restart the run of the test instructions at the end of the instruction locations (operation 284). In particular, process 200 calls for writing the unconditional branch instruction at the current instruction location (CA) that branches to the start point of the instruction set (SSA). Process 200 is then at an end.

Although FIGS. 2A and 2B illustrate one implementation of a process for generating instructions for testing a processor, other processes for generating processor test instructions may include additional, fewer, and/or a different arrangement of operations. For example, generating instructions for testing a processor may not include determining the amount of available locations and the locations for the test instructions. Additionally, the test instructions may begin being associated with instruction locations at a different location than the mid-point (e.g., the beginning or the end), and the branching instructions in the later instruction locations do not have to be generated before the branching instructions in the earlier instruction locations. As a further example, the branch hint bits do not have to be randomized. As another example, a different counter, or portion of a counter, may be associated with each branch instruction.

Figure 3:
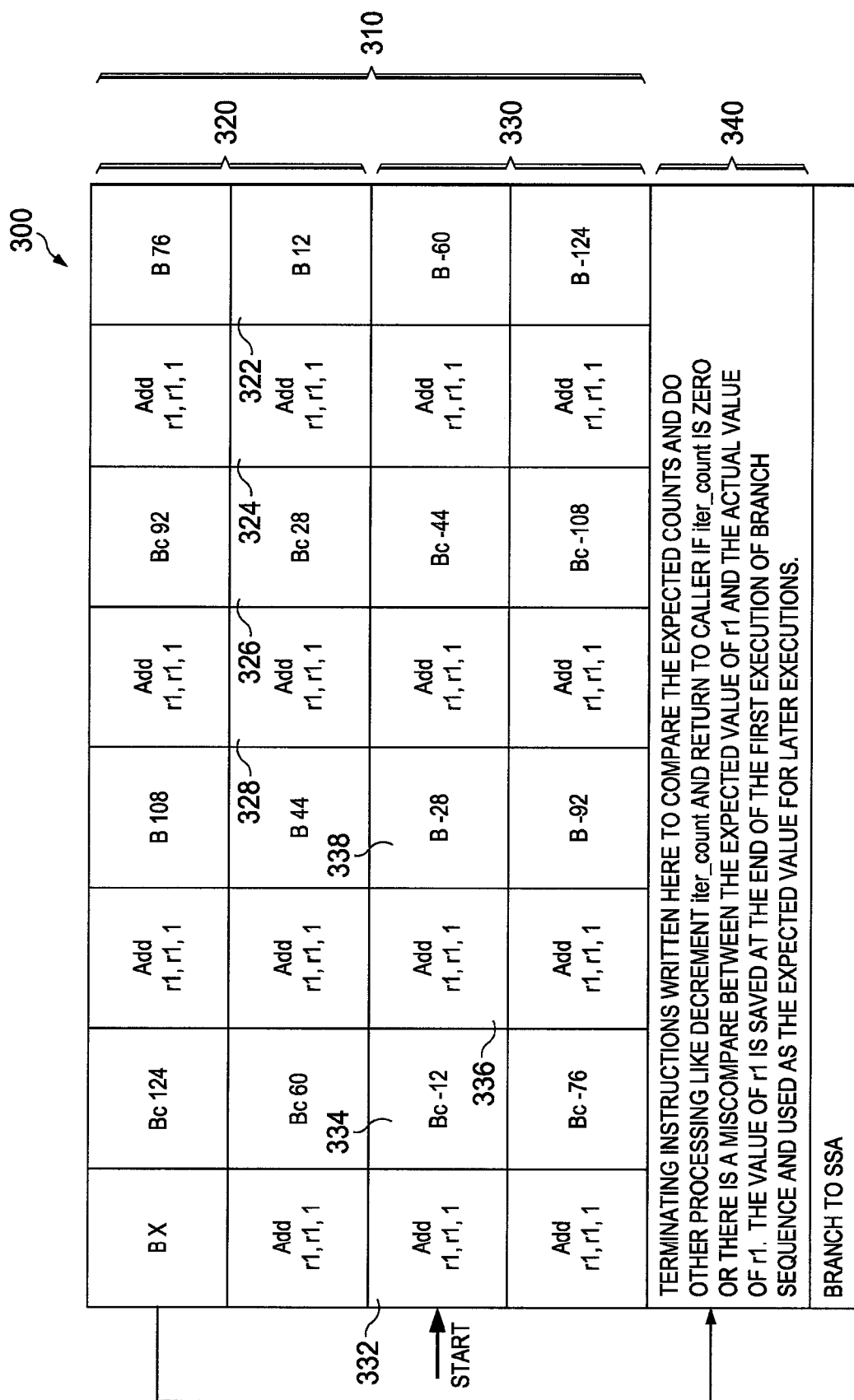
FIG. 3 illustrates a set of processor test instructions generated according to the process of FIGS. 2A and 2B.

FIG. 3 illustrates a set of instructions 300 generated according to process 200. Instructions 300 may, for example, form an instruction steam (reading from left to right) for testing a processor.

Instruction set 300 includes test instructions 310 and test analysis instruction 340. Test instructions 310 are the actual instructions used to test the performance of the processor of interest. Test analysis instructions 340 are used to evaluate the processor's performance.

Test instructions 310 are divided into a first portion 320 and a second portion 330. The first two test instructions in second portion 330 are a counter increment instruction 332 and a branch instruction 334. Counter increment instruction 332 is located at the beginning of second portion 330. As indicated previously, this location may, for example, be identified by determining the mid-point of the locations available for test instructions. Branch instruction 334 is located next to counter instruction 332 and conditionally branches to an instruction location three instruction locations backward (12 bytes/4 bytes/instructions=3 instructions) from the current branch instruction location. That is, the branching location is relative to the location of the current branch instruction and is predetermined. Whether this branch instruction is conditional or not may be randomly generated, and if it is conditional, the branch hint bits may be randomized.

The next two test instructions in second portion 330 are another counter increment instruction 336 and another branch instruction 338. Counter increment instruction 336 is located next to branch instruction 334, and branch instruction 338, which is unconditional, is located next to counter increment instruction 336 and branches to an instruction location seven instruction locations backward (28 bytes/4 bytes/instructions=7 instructions) from the branch instruction location. Whether this branch instruction is conditional or not may be randomly generated.

According to process 200, the instructions in second portion 330 are generated beginning at instruction 332, although they may be generated in any order in other implementations. The instructions in second portion 330 may continue to be generated in counter increment/branch instruction pairs until second portion 330 is substantially filled.

The last two test instructions in first portion 320 are a branch instruction 322 and a counter increment instruction 324. Branch instruction 322 is located at the end of first portion 320. This location may, for example, be identified by determining the mid-point of the locations available for test instructions. Branch instruction 322 is unconditional and branches to an instruction location three instruction locations forward (12 bytes/4 bytes/instructions=3 instructions) from the current branch instruction location. That is, the branching location is relative to the location of the current branch instruction, and in this implementation, the branching location is to counter instruction 336. Whether this branch instruction is conditional or not may be randomly generated, and if it is conditional, the branch hint bits may be randomized. Counter increment instruction 324 is next to branch instruction 322 and is branched to by branch instruction 334.

The next two test instructions in first portion 320 are another branch instruction 326 and another counter instruction 328. Branch instruction 326, which is conditional, is next to counter increment instruction 324 and branches to an instruction location seven instruction locations forward (28 bytes/4 bytes/instructions=7 instructions) from the branch instruction location. Whether this branch instruction is conditional or not may be randomly generated. Counter increment instruction 328 is next to branch instruction 326 and is branched to by branch instruction 338.

According to process 200, the instructions in first portion 320 are generated beginning at instruction 322, although they may be generated in any order in other implementations. The instructions in first portion 320 may continue to be generated in branch/counter increment instruction pairs until first portion 320 is substantially filled.

As illustrated, the branch instructions in first portion 320 branch to instructions in second portion 330, and the branch instructions in second portion 330 branch to instructions in first portion 320. Thus, test instructions 310 have an increased number of forward and backward branches with which to test a processor. Moreover, this branching forms a type of zigzag branching pattern in the instructions with the jump sizes increasing as the number of instructions increases, which further tests the processor. Additionally, the branch instructions may be randomly generated without creating infinite loops, which could occur if a completely random selection of branch instructions occurred.

In certain modes of operation, each execution of instructions 300 may be placed at different addresses in a computer readable storage memory (e.g., RAM) to further test an effective address table. The instructions may, for example, be randomly placed at different effective addresses in the memory. Thus, the effective address table may contain incorrect values for some or all the branched to locations and the processor will have to resolve the discrepancies between the appropriate branch to locations and those indicated by the effective address table. In particular implementations, the amount of instructions in instructions 300 may be made large enough so that the effective address table is filled for during an execution of the instructions.

Also as illustrated, a counter instruction occurs before each branch instruction. Thus, the number of branch instructions encountered during a run of test instructions 310 is determined during the run. Whether particular branch instructions are encountered during a run depends on whether the conditional branches conditions are satisfied, but this should not change from run to run unless the processor commits an error (e.g., fails to execute branch instructions correctly, fails to take a branch, reads memory incorrectly, etc.). Thus, the number of branches encountered during a run reflects on the number of branches taken and not taken. Memory may, for example, be read incorrectly if the effective address table indicates a different location than the one for the branched to instruction or if a bad cell in memory (e.g., RAM) is read.

Test analysis instructions 340 include the instructions for analyzing the results of running the test instructions with the processor to be tested. The first location in first portion 320, which is branched to by the last instruction in second portion 330, includes an unconditional branch instruction that branches to test analysis instructions 340. Test analysis instructions 340 may, for example, compare branch counters from different runs of test instructions 310 to determine whether a processor error occurred. If a processor error did occur, the test analysis instruction may generate alert for an operator.

Figure 4A:
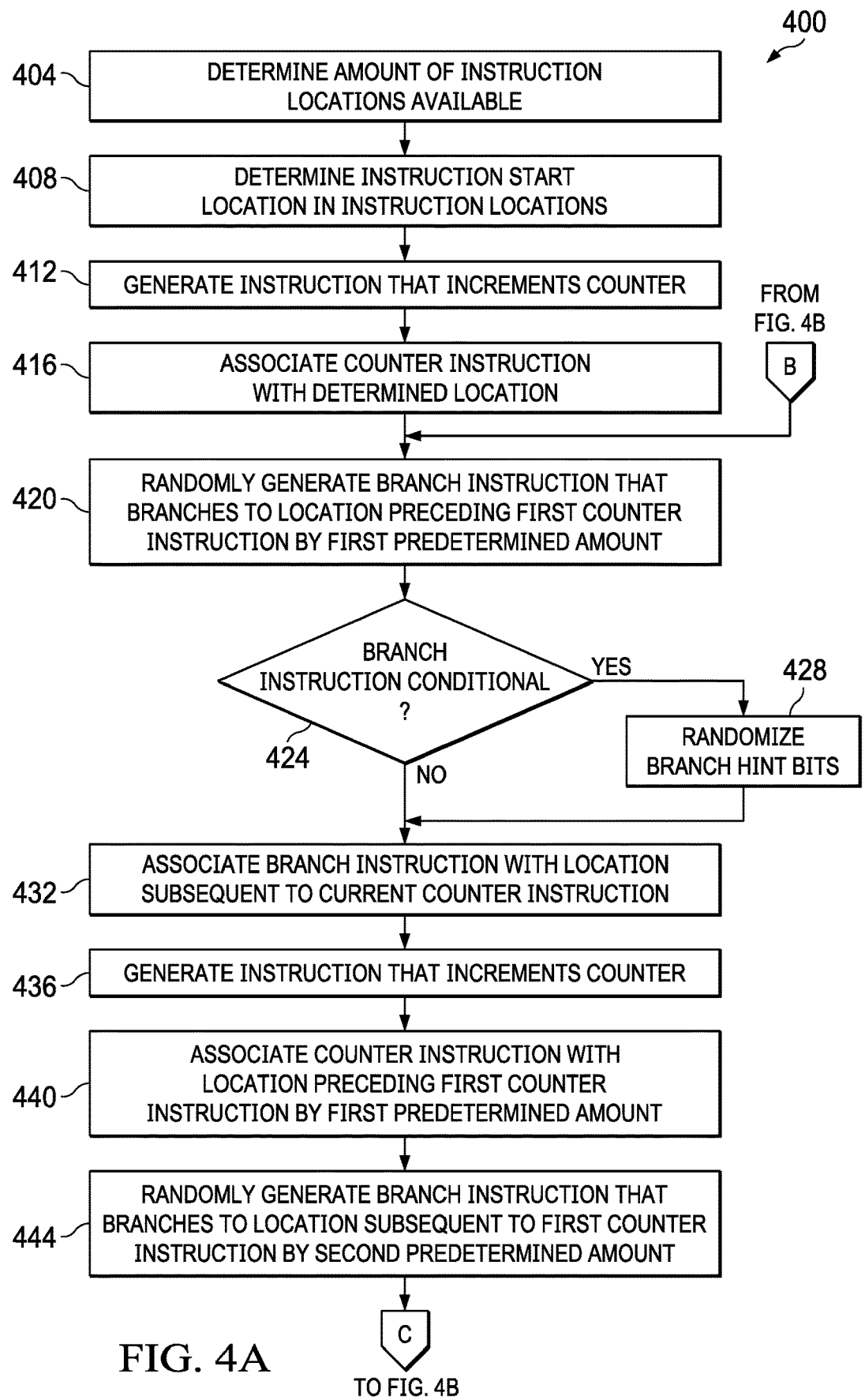
FIGS. 4A and 4B depict a flowchart that illustrates an additional example process for generating instructions for testing a processor.
Figure 4B:
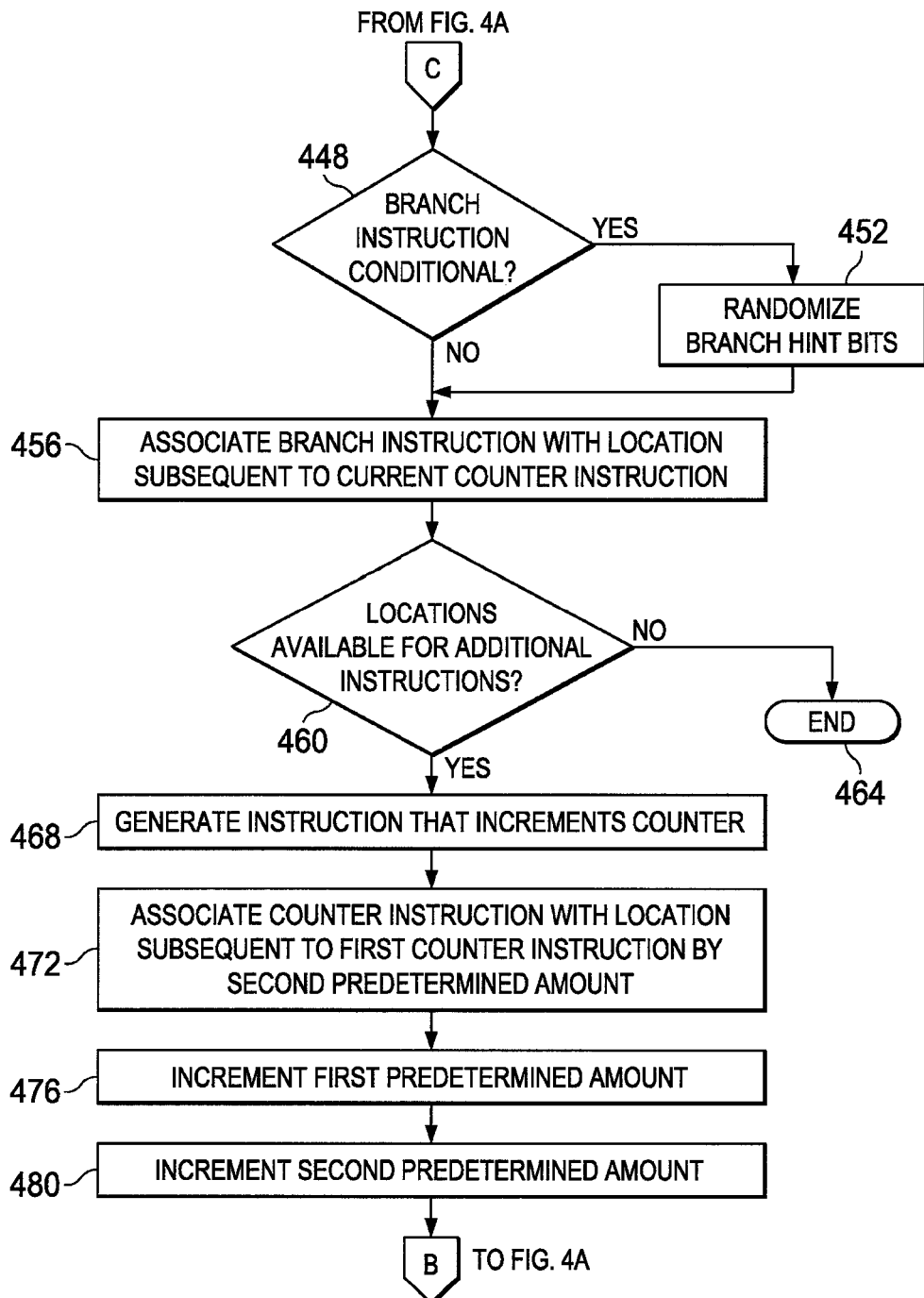

FIGS. 4A and 4B illustrate another example process 400 for generating test instructions for a processor. Process 400 may, for example, be executed on a general purpose computer, which may or may not include the processor to be tested.

Process 400 calls for determining the amount of locations available for test instructions (operation 404). Process 400 may, for example, accomplish this by determining the amount of memory available for the test instructions. Process 400 also calls for determining an instruction start location in the test instruction locations (operation 408). The location may, for example, be a location at which to start associating test instructions or a location at which test instructions have not been previously associated.

Process 400 additionally calls for generating an instruction that increments a counter (operation 412). The counter may, for example, be a general purpose register. Process 400 also calls for associating the counter instruction with the instruction start location (operation 416). For instance, the instruction could be written to the location.

Process 400 also calls for randomly generating a branch instruction that branches to an instruction location preceding the first counter instruction by a first predetermined amount (operation 420). Randomly generating a branch instruction may, for example, include randomly determining whether the branch instruction is conditional. The predetermined amount may identify an instruction location at least two instructions precedent to the first counter instruction.

Process 400 also calls for determining whether the generated branch instruction is a conditional branch instruction (operation 424). If the generated branch instruction is conditional, process 400 calls for randomizing the branch hint bits for the branch instruction (operation 428).

Process 400 continues with associating the generated branch instruction with a location subsequent to the current counter instruction (operation 432), which is the first counter instruction currently. The subsequent location may be contiguous or non-contiguous with the current counter instruction. Process 400 also calls for generating an instruction that increments the counter (operation 436) and associating the generated counter instruction with a location preceding the first counter instruction by the first predetermined amount (operation 440).

Process 400 continues with randomly generating a branch instruction that branches to an instruction location subsequent to the first counter instruction a second predetermined amount (operation 444). Randomly generating a branch instruction may, for example, include randomly determining whether the branch instruction is conditional. The second predetermined amount may identify a location subsequent to the previous branch instruction.

Process 400 also calls for determining whether the generated branch instruction is a conditional branch instruction (operation 448). If the generated branch instruction is conditional, process 400 calls for randomizing the branch hint bits for the branch instruction (operation 452). Process 400 further calls for associating the generated branch instruction with a location subsequent to the current counter instruction (operation 456). The subsequent location may or may not be contiguous with the counter instruction location.

Process 400 additionally calls for determining whether locations are available for additional test instructions (operation 460). If additional locations are not available, process 400 is at an end (operation 464).

If, however, additional instruction locations are available, process 400 calls for generating an instruction that increments the counter (operation 468) and associating the counter instruction with a location subsequent to the first counter instruction by the second predetermined amount (operation 472). Process 400 also calls for incrementing the first predetermined amount (operation 476), incrementing the second predetermined amount (operation 480), and returning to generate randomly generate another branch instruction that branches to a location preceding the first counter instruction by the first predetermined amount (operation 420). The increment of the first predetermined amount and the second predetermined amount may be at least two instructions.

Although FIGS. 4A and 4B illustrate one implementation of a process for generating for generating test instructions for a processor, other processes for generating test instructions may include additional, fewer, and/or a different arrangement of operations. For example, a process may not determine the amount of instruction locations available. Instead, for instance, it may be told how many instructions to generate. As another example, a process may generate the branch instructions that branch to a location subsequent to the determined location during one sequence and the branch instructions that branch to a location preceding the determined location during another sequence. As a further example, a process may associate test analysis instruction with the test instructions.

Figure 5:
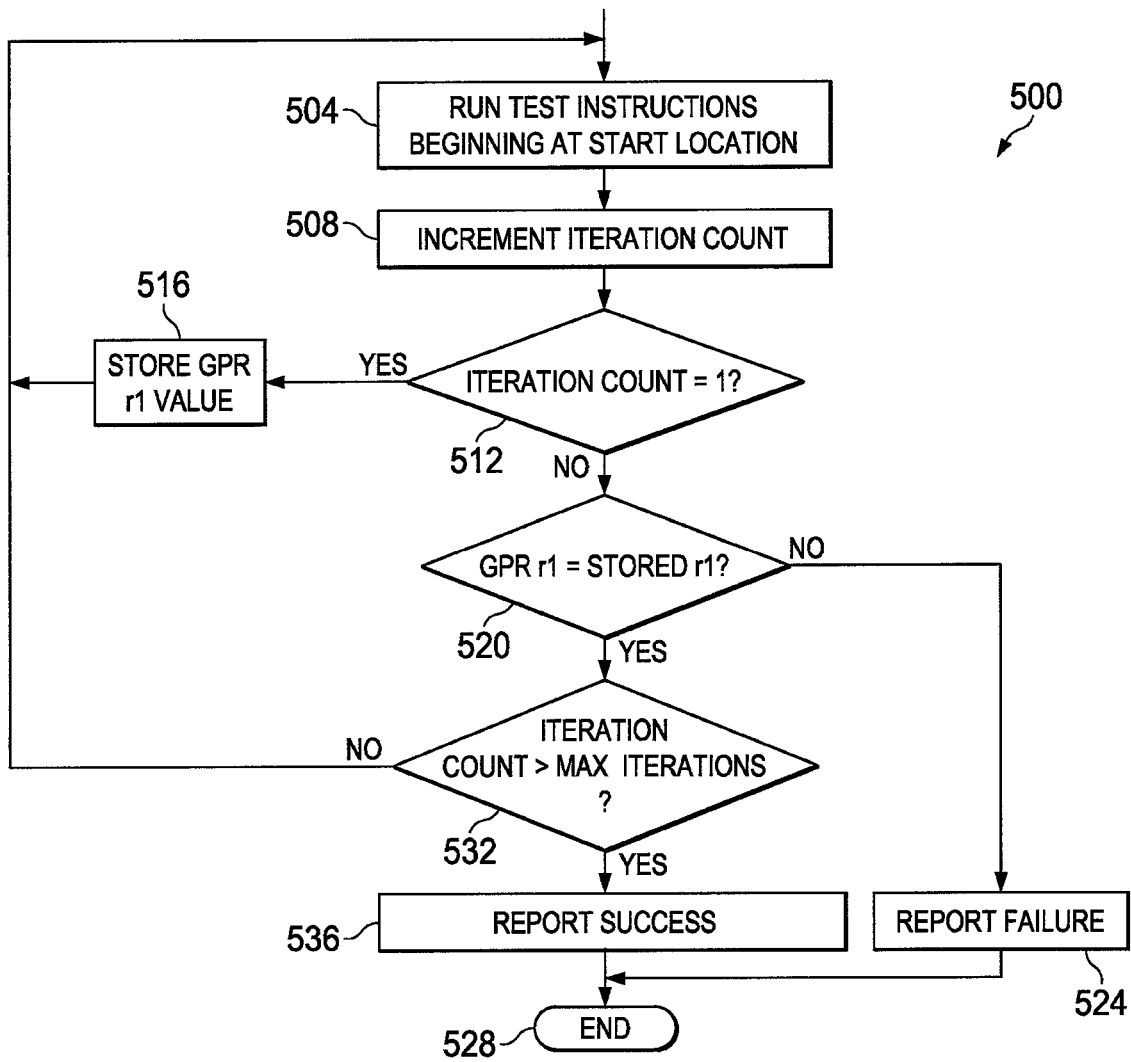
FIG. 5 is a flowchart that illustrates an example process for testing a processor.

FIG. 5 illustrates an example process 500 for testing a processor. In particular, process 500 uses previously generated test instructions to test the processor. The test instructions may, for example, have been generated by a similar to process 200. Process 500 may, for instance, illustrate operation according to test analysis instructions.

Process 500 begins with having the processor being tested run the test instructions beginning at the test instruction starting location (operation 504). In the example process illustrated by process 200, for instance, this may occur by beginning at the set starting location (SSA). Thus, the starting location of the test instructions may or may not be the first test instruction in a group of test instructions.

Once the processor has run the test instructions, process 500 calls for incrementing an iteration counter (operation 508). The test instructions are usually executed by the processor a number of times (e.g., 10-50) to test the processor. Process 500 also calls for determining whether this is the first time the test instructions have been run (operation 512). In particular, operation 512 calls for determining whether the iteration counter is equal to one. If the iteration counter is equal to one, process 500 calls for storing the branch counter generated during the running of the test instructions (operation 516) and returning to run the test instructions again (operation 504).

Once the iteration counter is not equal to one, process 500 calls for comparing the branch counter generated during the most recent running of the test instructions with the value stored previously (operation 520). If the most recent branch counter and the stored branch counter values are not equal, process 500 calls for reporting a processor failure (operation 524). A processor failure may, for example, be reported by generating a local or remote error message for an operator. Process 500 is then at an end (operation 528).

If, however, the recent branch counter and the stored branch counter values are equal, process 500 calls for determining whether the maximum number of iterations has been reached (operation 532). In particular, operation 532 calls for determining whether the iteration counter is greater than the maximum number of iterations. If the maximum number of iterations has been reached, process 500 calls for reporting a successful test of the processor (operation 536). Process 500 is then at an end (operation 528). If, however, the maximum number of iterations has not been reached, process 500 calls for returning to run the test instructions again (operation 504). The processor may, for example, branch to the instruction set start location (SSA), which may, for example, be in the middle of the test instructions.

Although FIG. 5 illustrates one implementation of a process for testing a processor, other processes for testing a processor may include additional, fewer, and/or a different arrangement of operations. For example, a processor testing process may not include testing the branch counter after every run. For instance, the test instructions may be run several times, and the branch counters may then be compared. As another example, the value of the branch counter may be determined before running the instructions during a test. Thus, the first iteration does not have to be used to establish this value. As a further example, a processor testing process may provide a report on the branches that were encountered.

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

Figure 6:
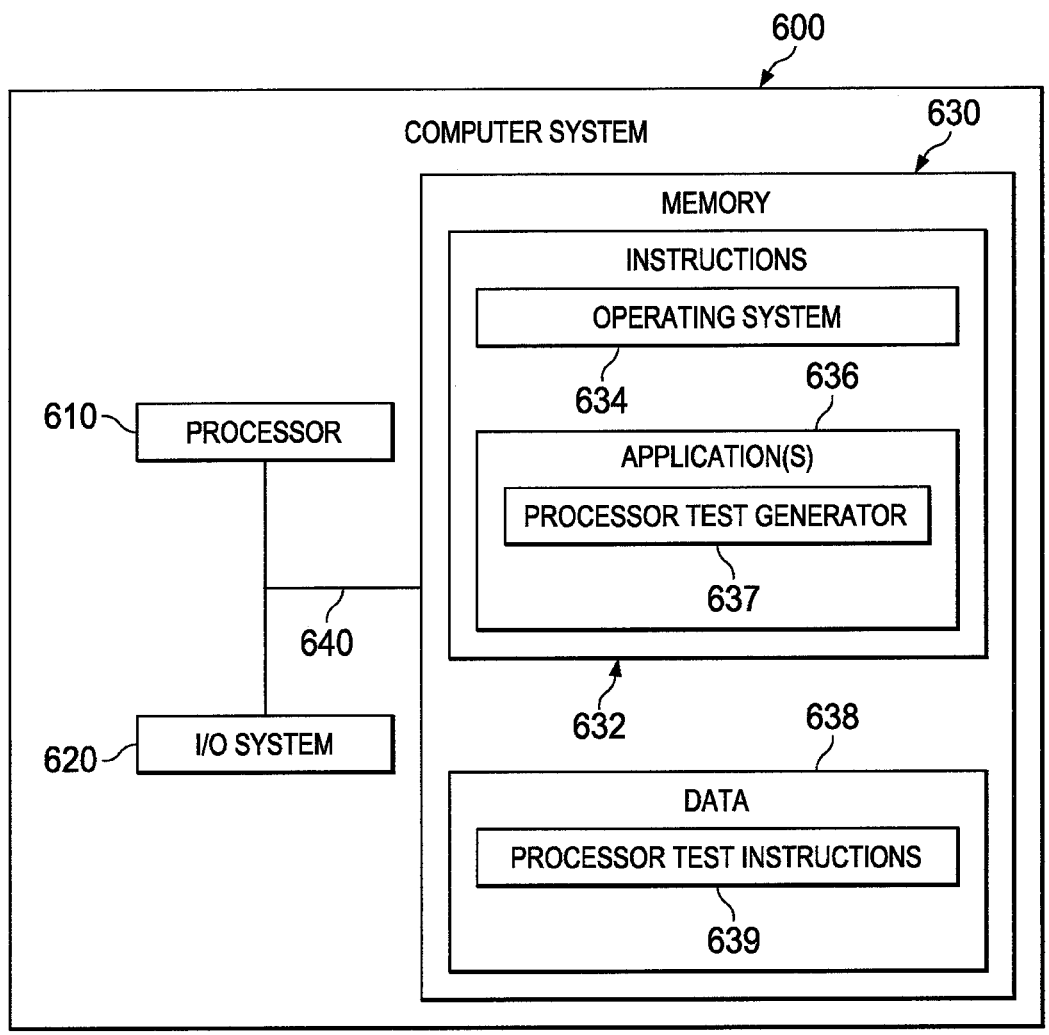
FIG. 6 is a block diagram that illustrates an example computer system for generating instructions for testing a processor.

FIG. 6 illustrates an example computer system 600 that can generate instructions for testing a processor. System 600 includes a processor 610, an input/output system 620, and memory 630, which are coupled together by a bus system 640.

Processor 610 may, for example, be a microprocessor, which could, for instance, operate according to reduced instruction set computer (RISC) or complex instruction set computer (CISC) principles. In general, processor 610 may be any device that manipulates information according in a logical manner.

Input/output system 620 may, for example, include a communication interface and/or a user interface. A communication interface may, for instance, be a network interface card (whether wireless or wireless) or a modem. A user interface could, for instance, include a user input device (e.g., a keyboard, a keypad, a touchpad, a stylus, or a microphone) and a user output device (e.g., a monitor, a display, or a speaker). In general, system 620 may be any combination of devices by which a computer system can receive and output information.

Memory 630 may, for example, include random access memory (RAM), read-only memory (ROM), and/or disc memory. Various items may be stored in different portions of the memory at various times. Memory 630, in general, may be any combination of devices for storing information.

Memory 630 includes instructions 632 and data 638. Instructions 632 include an operating system 634 (e.g., Windows, Linux, or Unix) and applications 636, one of which is a processor test generator 637. Processor test generator 637 is responsible for generating the instructions for a testing processor and can operate according to the processes described previously. Data 638 includes the data required for and generated by applications 636. For instance, data 638 may hold the inputs for the processor validation generator 637 and the generated processor test instructions 639.

Bus system 640 is responsible for communicating information between processor 610, input/output system 620, and memory 630. Bus system 640 may, for example, include a number of different types of busses (e.g., serial and parallel).

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for testing a processor, and several others have been mentioned or suggested. Moreover, those skilled in the art will readily recognize that a variety of additions, deletions, modifications, and substitutions may be made to these implementations while still achieving processor testing. Thus, the scope of the protected subject matter should be judged based on the following claims, which may capture one or more concepts of one or more implementations.

The invention claimed is:

1. A method comprising:
    generating a set of test instructions having a first portion and a second portion;
    randomly generating a first branch instruction for the first portion, the first branch instruction branching to a respective instruction in the second portion by a branching location offset;
    randomly generating a second branch instruction for the second portion, the second branch instruction branching to a respective instruction in the first portion by the branching location offset;
    determining whether to add another instruction to the set of test instructions;
    responsive to determining to add another instruction to the set of test instructions, incrementing a value of the branching location offset by a predetermined amount; and
    writing the set of test instructions to a computer readable storage medium.

2. The method of claim 1, wherein randomly generating the first and second branch instructions comprises randomly selecting whether the respective first and second branch instruction is a conditional branch.

3. The method of claim 1, further comprising:
    generating a first counter instruction that increments a counter, the first counter instruction to be placed at a first location in the set of test instructions;
    placing the first branch instruction at an instruction set location subsequent the first counter instruction and branching to an instruction set location preceding the first counter instruction by the branching location offset;
    generating a second counter instruction that increments the counter, the second counter instruction to be placed at the location preceding the first counter instruction; and
    placing the second branch instruction at an instruction set location subsequent the second counter instruction and branching to an instruction set location subsequent the first branch instruction.

4. The method of claim 3, further comprising:
    generating a third counter instruction that increments the counter, the third counter instruction to be placed at the location subsequent the first branch instruction;
    randomly generating a third branch instruction, the third branch instruction to be placed at an instruction set location subsequent the third counter instruction and branching to an instruction set location preceding the first counter instruction by the incremented value of the branching location offset;
    generating a fourth counter instruction that increments the counter, the fourth counter instruction to be placed at the location preceding the first counter instruction by the incremented value of the branching location offset; and randomly generating a fourth branch instruction, the fourth branch instruction to be placed at an instruction set location subsequent the fourth counter instruction and branching to a location subsequent the third branch instruction.

5. The method of claim 1, further comprising writing processor performance analysis instructions in the set of test instructions, the analysis instructions determining whether a predetermined number of branches is encountered during execution of the set of test instructions.

6. The method of claim 3, further comprising
determining an amount of instruction set locations available; and
generating additional branch and counter instructions to at least substantially fill the amount of instruction set locations.

7. The method of claim 6, further comprising:
determining an approximate mid-point of the amount of instruction locations; and
placing a first counter instruction at the approximate mid-point.

8. The method of claim 6, further comprising
determining an amount of instruction set locations needed for storing processor performance analysis instructions; and
reducing the amount of instruction set locations available for storing the respective branch and counter instructions by the amount of instruction set locations needed for storing the processor performance analysis instructions.

9. The method of claim 1, wherein the first portion is contiguous with the second portion.

10. The method of claim 1, further comprising:
operating a processor according to the set of test instructions a plurality of times;
determining the number of branches encountered by the processor during each run of the set of test instructions; and
evaluating the number of branches encountered by the processor during each run of the set of test instructions to determine whether an error occurred in the processor.

11. A system comprising:
a computer readable storage medium storing instructions for processor testing; and
a processor, according to the instructions, configured to:
generate a set of test instructions having a first portion and a second portion;
randomly generate a first branch instruction for the first portion, the first branch instruction branching to a respective instruction in the second portion by a branching location offset;
randomly generate a second branch instruction for the second portion, the second branch instruction branching to a respective instruction in the first portion by the branching location offset;
determine whether to add another instruction to the set of test instructions;
responsive to determining to add an other instruction to the set of test instructions, increment a value of the branching location offset by a predetermined amount; and
write the set of test instructions to the computer readable storage medium.

12. The system of claim 11, wherein the processor randomly selects whether the respective first and second branch instructions are a conditional branch.

13. The system of claim 11, wherein the processor is further configured to:
generate a first counter instruction that increments a counter, the first counter instruction to be placed at a first location in the set of test instructions;
place the first branch instruction at an instruction set location subsequent the first counter instruction and branching to an instruction set location preceding the first counter instruction by the branching location offset;
generate a second counter instruction that increments the counter, the second counter instruction to be placed at the location preceding the first counter instruction; and
place the second branch instruction at an instruction set location subsequent the second counter instruction and branching to an instruction set location subsequent the first branch instruction.

14. The system of claim 11, wherein the processor also writes processor performance analysis instructions in the set of test instructions, the analysis instructions determining whether a predetermined number of branches is encountered during execution of the set of test instructions.

15. The system of claim 11, wherein the first portion is contiguous with the second portion.

16. The system of claim 11, the processor also randomizes branch hint bits for a branch instruction based on the branch instruction being conditional.

17. A computer program product for generating test instructions for a processor, the computer program product comprising:
a computer readable storage medium having computer readable program code embodied therewith, the computer readable program code comprising computer readable program code configured to:
generate a set of test instructions having a first portion and a second portion;
randomly generate a first branch instruction for the first portion, the first branch instruction branching to a respective instruction in the second portion by a branching location offset;
randomly generate a second branch instruction for the second portion, the second branch instruction branching to a respective instruction in the first portion by the branching location offset;
determine whether to add another instruction to the set of test instructions; and
responsive to determining to add an other instruction to the set of test instructions, increment a value of the branching location offset by a predetermined amount.

18. The computer program product of claim 17, wherein the computer readable program code is configured to randomly select whether the branch instructions are a conditional branch.

19. The computer program product of claim 17, wherein the computer readable program code is configured to:
generate a first counter instruction that increments a counter, the first counter instruction to be placed at a first location in the set of test instructions;
place the first branch instruction at an instruction set location subsequent the first counter instruction and branching to an instruction set location preceding the first counter instruction by a the branching location offset;

generate a second counter instruction that increments the counter, the second counter instruction to be placed at the location preceding the first counter instruction; and place the second branch instruction at an instruction set location subsequent the second counter instruction and branching to an instruction set location subsequent the first branch instruction.

20. The computer program product of claim 17, wherein the first portion is contiguous with the second portion.

* * * * *